R. F. STEWART.
BUTTER CUTTING MACHINE.
APPLICATION FILED JUNE 14, 1909.
935,425.
Patented Sept. 28, 1909.
3 SHEETS—SHEET 3.
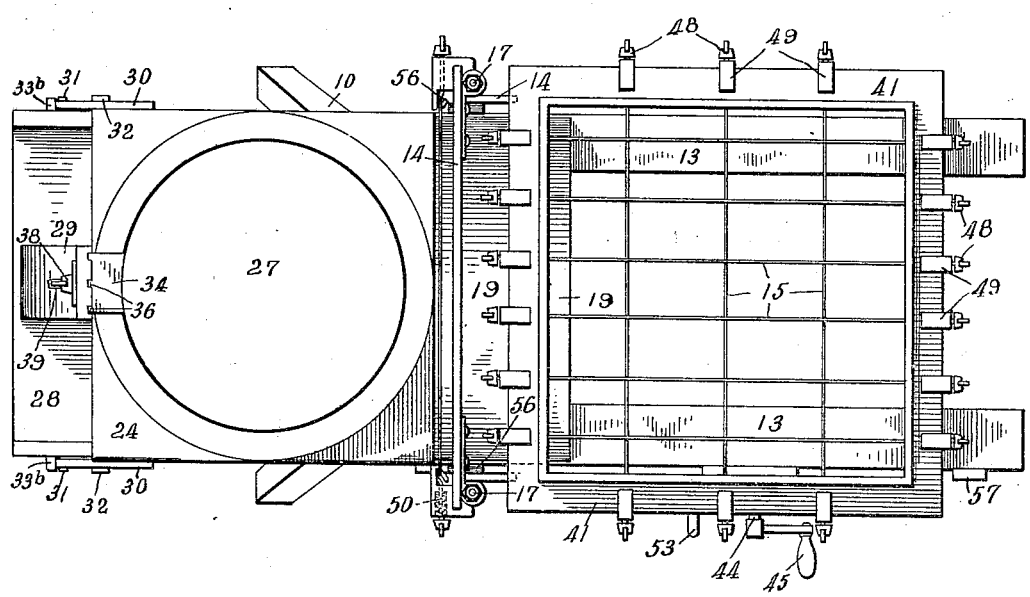
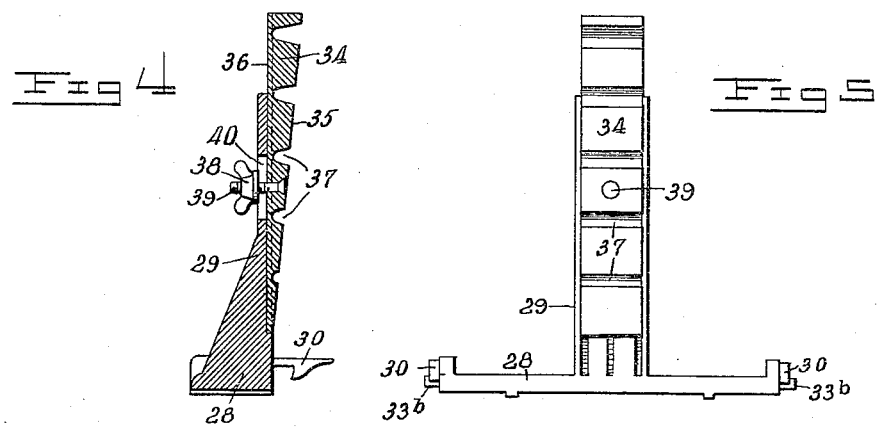
Inventor
Richard F. Stewart

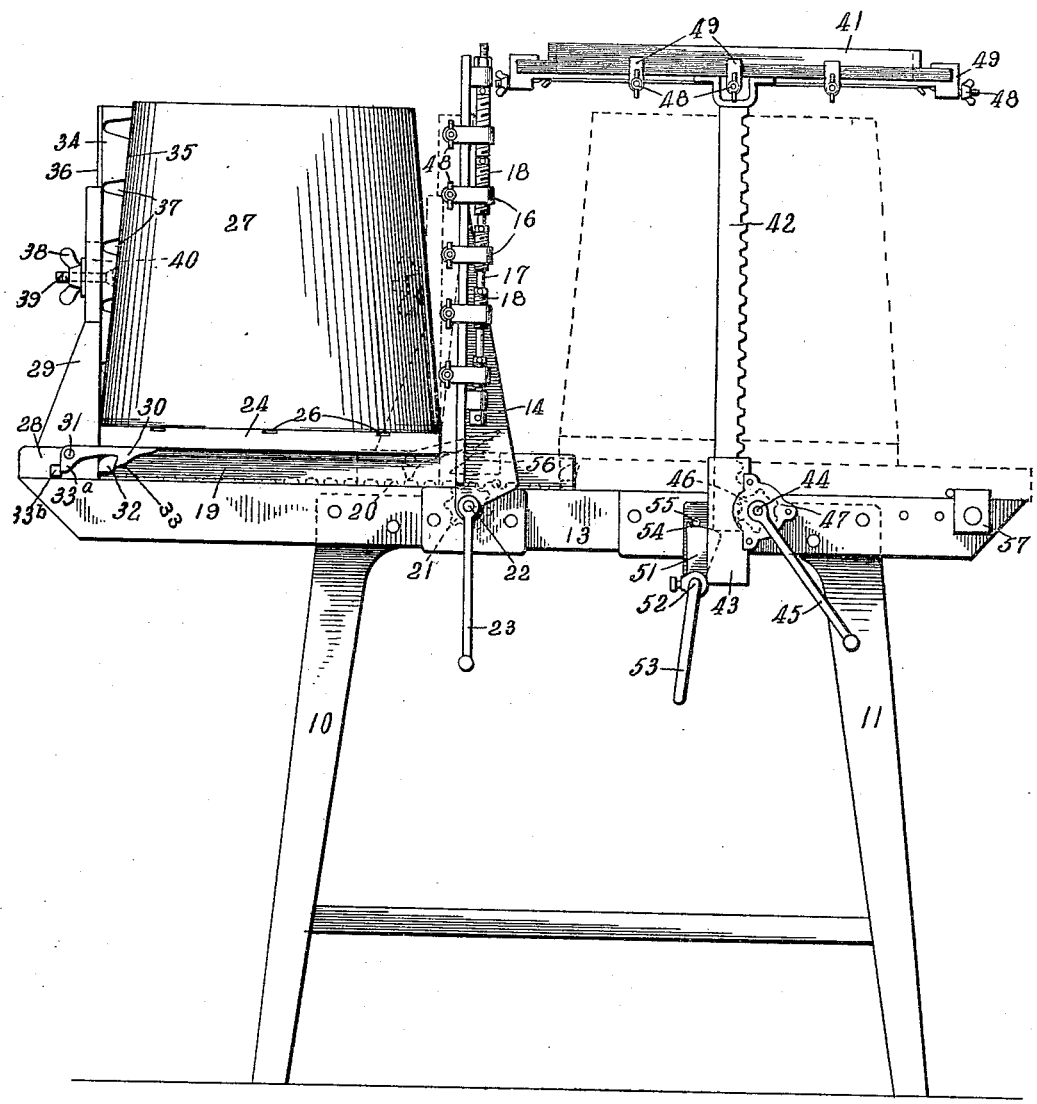

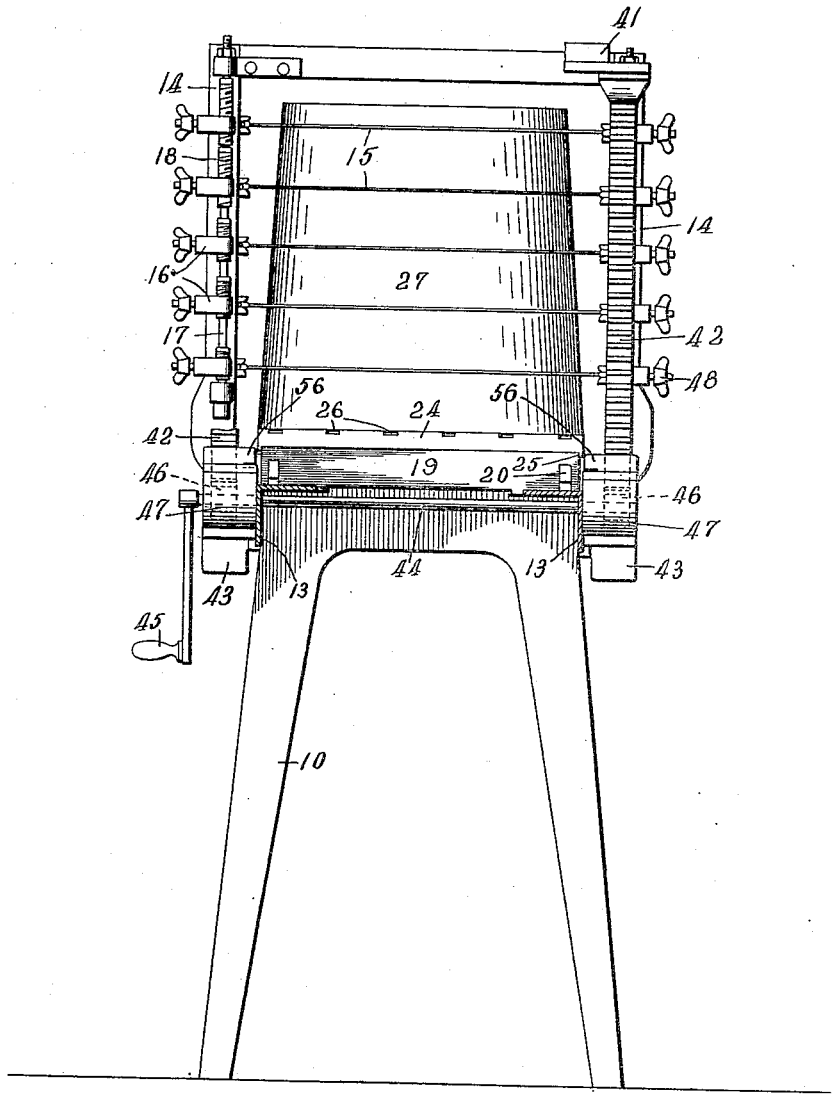

UNITED STATES PATENT OFFICE.

RICHARD F. STEWART, OF NEW YORK, N. Y.

BUTTER-CUTTING MACHINE.

935,425.   Specification of Letters Patent.   Patented Sept. 28, 1909.

Application filed June 14, 1909. Serial No. 502,137.

*To all whom it may concern:*

Be it known that I, RICHARD F. STEWART, a citizen of the United States, residing at New York, in the county of New York and State of New York, have invented new and useful Improvements in Butter-Cutting Machines, of which the following is a specification.

My invention consists in improvements in butter machines, and I have embodied these improvements in a butter cutting machine which has proven must practical and efficient.

The various improvements consist in part in improvements in the structural details of the machine and in part in the arrangement of the mechanical parts of the machine to the end of securing most efficient results.

In butter cutting machines as heretofore manufactured, a set of cutting wires in a vertical plane and second set of cutting wires in a horizontal plane have been used successively upon a block of material to be cut, this block of material being carried forward into a position to be engaged by the cutting strands or wires by a carriage moving on suitably placed rails.

In order to firmly hold the block of material in place on the carriage an abutment has been provided at the rear end of the carriage. It is, of course, impossible for this abutment to move beyond the cutting strands of wires which the block of material to be cut first engages, and various means have been devised to permit the carriage to carry the block of material beyond the first set of cutting strands, usually the set disposed in a vertical plane, and to carry the block of material to a position to be engaged by the second set of cutting strands, usually the horizontally arranged set.

One of the most important features of my invention consists in the connection of this abutment to the carriage. I so make this connection and so arrange automatic devices for acting upon it that the abutment is automatically disengaged from the carriage and left behind the first set of strands, while the carriage proceeds beyond them with the block of material, carrying it into position to be cut by the second set of strands. It is also usual in such machines to cut the block of material into sections along horizontal planes by moving the carriage carrying block of material along the frame of the machine, so that the block of material moves against and through the set of acting strands or wires arranged in a vertical plane, this being accomplished by a turning of a suitably arranged operating device. When the block of material is in position to be cut along the vertical plane into blocks of final shape and size the same operating device is manipulated to stop the travel of the carriage and move the second set of cutting strands vertically downward and through the block of material.

A second important feature of my invention consists in the provision of separate actuating or operating means for the carriage carrying the block of material and for the second set of cutting strands or wires.

While the above two features are the most important in my improved machine, there are several minor improvements which will be pointed out in connection with the others in the description which follows, and all the said improvements will be particularly singled out in the annexed claims.

In the drawings which accompany the description, Figure 1 is a side elevation. Fig. 2 is an end elevation. Fig. 3 is a plan of my improved machine. Fig. 4 is a sectional side elevation of the frame carrying the abutment, and Fig. 5 is a front elevation of the same.

10 and 11 are stools supporting two parallel rails 13 and together they form the main frame of the machine.

Mounted adjacent the stool 10 and bolted to the rails 13 is a frame 14 carrying the cutting strands 15 in a vertical plane and equally spaced apart. As shown, these cutting strands are adjustably mounted, the lugs 16 being slidably mounted on the opposite sides of the frame 14 and interconnected by means of rods 17 carrying sleeves 18 screw-threaded into the ends of the lugs. These sleeves are provided with threads of different pitch, so that when the rod 17 is turned the distance between the strands is varied, while the spacing between the adjacent strands is maintained equal in such a manner that a block of material to be cut by the strands is cut along the horizontal planes equal distances apart, no matter what be that adjusted distance. This is fully claimed in United States Letters Patent issued to me.

Mounted to slide on the rails 13 is a carriage 19 provided on its underside with a rack 20 engaging an operating pinion 21 on a cross-shaft 22, provided with an operating handle 23. By turning this handle the carriage 19 may be moved forward and backward over the rails 13. This carriage supports a platen 24 which is held in position by means of side flanges 25 extending downward over the sides of the carriage 19. This platen is provided with slots 26 of suitable width at right angles to each other and in a position to receive the cutting strands which have been passed through a block of material to be cut, thus allowing the strands to cut clear through the block as is common. By separately mounting the platen 24, as shown, the platen can be readily removed for cleaning, and by the use of several platens successive blocks of material may be removed from the receptacles containing it and transferred upon the platen to the machine, the platen being used in lifting and handling the blocks of material. The block 27 of material occupies a position shown on the platen when the platen is in position on the carriage. Also mounted to slide on the rails 13 is a frame 28 carrying an abutment 29 for engaging the rear side of the block of material for holding it in position on the platen. This frame 28 is shown as separate from the carriage frame, but is normally coupled to it by a hook pivoted to the frame 28 at 31 and engaging a lug 32 on the side of the carriage frame. I have found it best to provide two of these hooks 30, one on each side of the frame 28, as shown. Each of these hooks 30 is provided with an extension 33 on its front end with a beveled face, as shown, for a purpose which will presently appear. The rear end of the lug adjacent the pivot 31 is provided with a shoulder 33ª engaging the lug 33ᵇ on the frame 28, the shoulder and lug being so proportioned that the hook is normally held in the position shown when it is disengaged from the lug 32. I prefer to make the abutment 29 integral with the frame 28, though, of course, it may not be so made, and may be attached in any suitable manner. The abutment 29 carries an adjustable rest piece 34, one face of which 35 is beveled, and the other face of which is provided with rails 36 adapted to slide in suitable slots in the face of the abutment. The beveled face of the rest is provided with a series of transverse slots 37 for receiving the cutting strands or wires which cut the block of material along horizontal planes. A wing-nut 38 screw-threaded onto a bolt 39 passing through an elongated slot 40 in the abutment 29 and supporting the rest 34, is the means for adjusting the rest.

Mounted at the proper point in advance of the set of cutting strands previously described is a frame 41 carrying a set of longitudinal and a set of transverse cutting wires crossing each other at right angles. This frame is supported by a pair of rack rods 42 passing through slides 43, one bolted to each side of the machine. These slides or bearing boxes 43 are made quite long, the length being amply sufficient to give good bearing surfaces and insure the rack rods 42 being accurately guided in a vertical plane and preventing the frame 41 from lateral movement in any direction during the cutting operation. A transverse shaft 44 operated by a handle 45 carries pinions 46, one on each side of the machine and meshing with the teeth on the rack rods 42, preferably, though not necessarily, within the slots or boxes 43. Suitable casings 47 are provided for the pinions 46. The cutting strands are provided with adjusting screws 48 mounted in movable lugs 49, whereby the tension on the wires and the distances between them may be adjusted. To adjust the tension a thumb-screw is turned back or forward, the tension being applied through a spring 50 to adjust the distance between the wires. The lugs supporting them are spaced as desired along the edge of the frame 41. The frame is normally held in its uppermost position, as shown, by means of a detent 51 pivoted at 52 on the frame, entering the box 43 beneath the end of one of the rack rods 42 at one end, and provided at the other end with a suitable operating handle 53. The end of the detent entering the box 43 is provided with a boss engaging a stop pin 55 to prevent its entering the box too far and possibly becoming jammed or being made stiff or hard in its operation. Adjacent the frame 14 or at another suitable point, is a cam surface 56 fixed to the frame of the machine and in a position to engage the beveled end of the hook 30, previously described.

The operation of my machine is as follows: The butter block 24 carrying the block of butter or material to be cut is placed on the carriage 19, and the frame 28 is coupled to the carriage 19 by means of the hook 30 engaging the lug 32. The block or platen 24 is then shoved along the carriage until it engages the abutment 29 when the rest piece 34 is adjusted until its face 35 engages the side of the block adjacent to it, and it is clamped into position by means of the wing-nut 38. The strands 15 having been previously adjusted by the turning of the rods 17, the carriage 19 is moved forward by the turning of the handle 23. The strands 15 cut the block along horizontal planes emerging from the block into slots 37 and the abutment 29 approaches the cutting strands. Just before the strands engage the bottoms of the slots 37 in the rest, the ends 33 of the hooks 30 engage the cam surface 56, and the frame 28 is uncoupled from the carriage 19.

The frame 28 therefore comes to rest on the rails 13 without engaging the cutting strands supported by the frame 14, while the carriage 19 proceeds freely with the block of material into position beneath the frame 41 carrying the horizontally disposed cutting strands. The carriage is stopped in position beneath this frame either by hand or by engagement of the end of the carriage with an adjustable lug or stop 57 on one of the rails. The detent is removed from the slide 43 by means of this handle 53, and the rack-rods 42 being released the frame 41 is lowered to the top of the block of material. The block may then be subdivided into blocks of smaller sizes, as determined by the spacing of the strands carried by the frame 41, by turning the handle 45 in the proper direction, the frame 41 being drawn downward and the strands cutting through the block or mass of material in vertical planes. The material in this form may then be removed. Preferably the frame 41 is again raised in position and the mass of material now cut up into smaller blocks bodily removed upon the platen 24. The carriage may then be run back to its first position. In running back the lugs 32 automatically raise the hooks 30 and couple the frame 28 to the carriage 19, the hooks 30 having been held in position to be engaged by the lugs by shoulders 33ª and 33ᵇ.

It will thus be observed that I have produced an extremely efficient mechanism for manipulating the abutment connected to the rear end of the carriage, the operation of this means being entirely automatic, the abutment being automatically uncoupled from the carriage at the proper time in the forward movement and again coupled into position for again operating upon the return movement of the carriage. It will also be observed that by the use of separate operating devices for the carriage and for the overhead cutting frame I have obviated the use of change gears or clutches. There is therefore but little chance for my machine to get out of order, and it can be made most durable and efficient.

While I have described the best form of my invention now known to me, it will be readily understood that many changes may be made in the details of this construction without departing from the generic spirit of the invention involved in the improvements thereon. I desire to have it understood that I aim in the annexed claims to cover all such modifications.

What I claim is:

1. In a butter cutting machine, means for supporting a block of butter to be cut, means for cutting said block, an abutment attached to said supporting means for taking the thrust on said block during the cutting operation, and means for detaching said abutment from said support at the end of the cutting operation.

2. In a butter cutting machine, means for supporting a block of butter to be cut, means for cutting said block, an abutment coupled to said supporting means for taking the thrust on said block during the cutting operation, and automatic means for uncoupling said abutment from said support at the end of the cutting operation.

3. In a butter cutting machine, a carriage for supporting a block of butter to be cut, means for cutting said block, an abutment attached to said carriage for taking the thrust on said block during the cutting operation, and means for detaching said abutment from said carriage at the end of the cutting operation.

4. In a butter cutting machine, a carriage for supporting a block of butter to be cut, means for cutting said block, a frame coupled to said carriage carrying an abutment for taking thrust on said block during the cutting operation, and automatic means for uncoupling said frame from said carriage at the end of the cutting operation.

5. In a butter cutting machine, means for supporting a block of butter to be cut, means for cutting said block, an abutment coupled to said supporting means for taking the thrust on said block during the cutting operation, means for moving said supporting means and cutting means relative to each other to cut said block, automatic means for uncoupling said abutment from said supporting means at the end of the cutting operation, and automatic means for again coupling said abutment to said supporting means upon the return of the supporting means and cutting means to their original relative positions.

6. In a butter cutting machine, a carriage for supporting a block of material to be cut, means for cutting said block, an abutment coupled to said carriage for taking the thrust on the block during the cutting operation, means for moving said carriage forward to cause said block to be cut by the cutting means, means for automatically uncoupling said abutment from said carriage at the end of the cutting operation, and automatic means for again coupling the abutment to the carriage upon its return movement.

7. In a butter cutting machine, a carriage for supporting a block of material to be cut, means for cutting said block, a frame carrying an abutment adjacent one end of said carriage, means coupling the frame to the carriage comprising a hook on the one member coöperating with a lug on the other member, means for moving said carriage forward to cause a block of material to be cut and then moving it backward to receive a new block of material, means comprising a cam for engaging said hook to automatically uncouple the frame from the carriage at the end of the cutting operation, means for maintaining the hook in a certain position relative to the lug, and means on the hook coöperating with the lug for again coupling the frame to the carriage upon its return movement.

8. In a butter cutting machine, a main frame, movable means for supporting a block of material to be cut, cutting strands, and a removable platen resting on said supporting means, carrying the block of material to be cut and provided on its carrying face with slots adapted to accommodate the cutting strands.

9. In a butter cutting machine, a carriage for supporting a block of material to be cut, cutting means, means for moving the carriage to cause the block of material to be cut by said cutting means, a removable platen upon the carriage carrying the block of material, and means for positioning said platen with respect to the carriage.

10. In a butter cutting machine, a carriage for supporting a block of material to be cut, cutting means, means for moving the carriage, to cause the block of material to be cut by said cutting means, a removable platen upon the carriage carrying the block of material, and means for positioning the platen with respect to the carriage comprising flanges extending downward from the platen and over the sides of the carriage.

11. In a butter cutting machine, a base, a cutting frame, a pair of rack-rods for supporting and operating said cutting frame, and means for guiding said rack-rods from said base comprising long journal boxes attached to said base, said rack rods constituting the sole support, and guiding means for said cutting frame.

12. In a butter cutting machine, a main frame, a reciprocable cutting frame, a pair of rack-rods for supporting and operating said frame, means for supporting and guiding said rack-rods comprising guide boxes attached to said base, a detent pivoted at one side of and entering one of said boxes and adapted to extend into the path of the rod entering said box to position the cutting frame with respect to the main frame.

13. In a butter cutting machine, a main frame, a cutting frame, a pair of rack-rods for operating said frame, means for supporting and guiding said rack-rods comprising guide boxes attached to the frame, a transverse shaft mounted on said main frame, and pinions on the shaft engaging the rack-rods within the guide boxes.

14. In a butter cutting machine, a main frame, a cutting frame, a pair of rack-rods for operating said frame, means for supporting and guiding said rack-rods comprising guide boxes attached to the frame, a transverse shaft mounted on said main frame, pinions on the shaft engaging the rack-rods within the guide-boxes, and casings for the pinions protruding from the guide-boxes.

15. In a butter cutting machine a carriage for supporting a block of material to be cut, operating means for the carriage, a cutting frame supporting cutting strands against which the block of material is adapted to be moved, a second cutting frame carrying cutting strands independent of the first frame, and operating means for said second cutting frame independent of the carriage operating means for reciprocating said second cutting frame.

16. In a machine of the character described, cutting means, supporting means for the material to be cut adapted to be moved to carry said material against said cutting means, a device coupled to said supporting means for taking the thrust of said material caused by its engagement with said cutting means, and automatic means for uncoupling said device from said supporting means as it approaches the cutting means.

In testimony whereof I have hereunto set my hand in presence of two subscribing witnesses.

RICHARD F. STEWART.

Witnesses:
KATHERINE C. GLANVILLE,
WILLIAM A. PRATT.